J. W. RICHARDS.
RAT TRAP.
APPLICATION FILED OCT. 8, 1919.
1,339,135. Patented May 4, 1920.
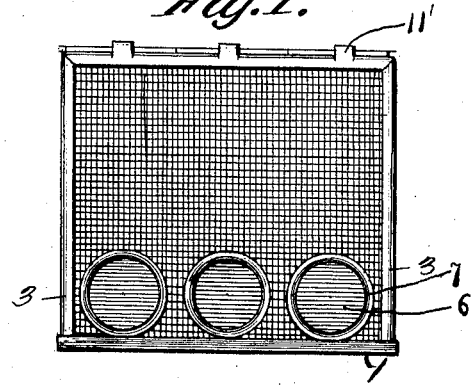
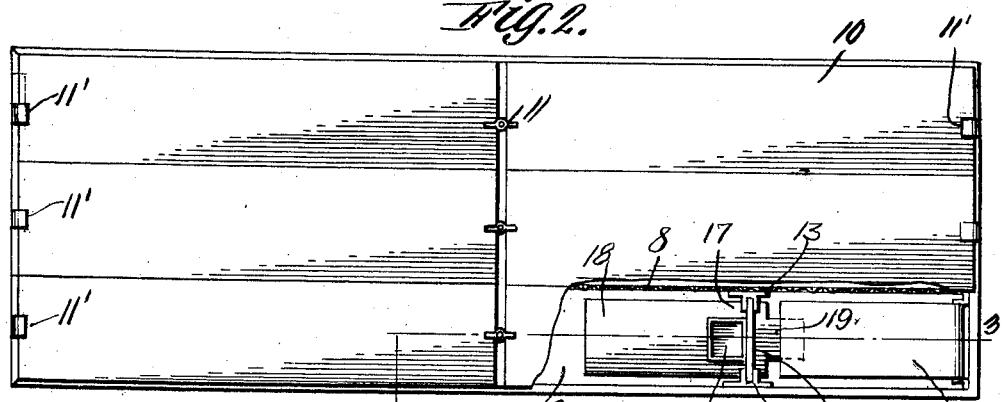
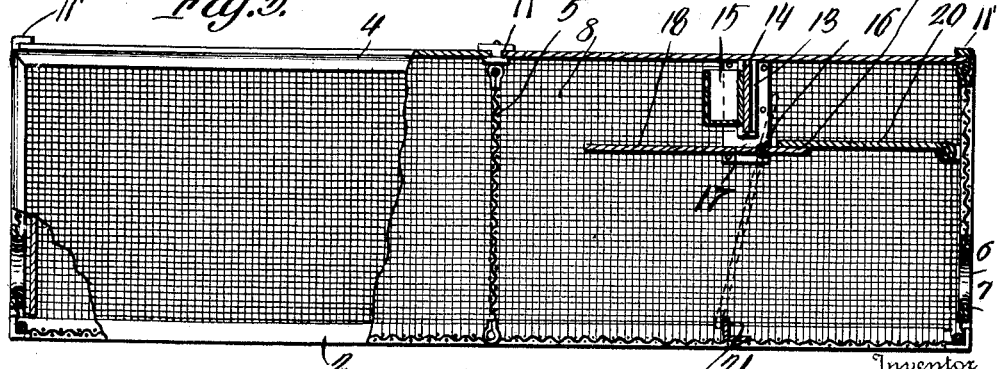
WITNESSES
Guy M. Spring
Wm. H. Milligan
Inventor
John W. RICHARDS
By Richard B. Owen
Attorney

UNITED STATES PATENT OFFICE.

JOHN W. RICHARDS, OF RALSTON, KENTUCKY.

RAT-TRAP.

1,339,135.   Specification of Letters Patent.   Patented May 4, 1920.

Application filed October 8, 1919. Serial No. 329,347.

*To all whom it may concern:*

Be it known that I, JOHN W. RICHARDS, a citizen of the United States, residing at Ralston, in the county of Bell and State of Kentucky, have invented certain new and useful Improvements in Rat-Traps, of which the following is a specification.

This invention relates to animal traps and more particularly to a trap especially adapted for catching rats and other small rodents.

The primary object of this invention is to provide a box like structure having a plurality of compartments therein each of which is adapted to receive and trap the rodents so that several rodents may be caught at one setting of the trap.

A further object of this invention is the production of a device of this character which consists of comparatively few parts and is simple in construction but durable and well adapted to withstand the rough usage to which devices of this character are ordinarily subjected.

For a full description of the invention and the advantages and merits thereof, reference is to be had to the following description and accompanying drawings, in which:—

Figure 1 is an end elevation of the trap constructed in accordance with my invention, Fig. 2 is a plan view, parts being broken away to show some of the interior structure, and Fig. 3 is a section taken approximately on the line 3—3 of Fig. 2.

Referring to the drawings, wherein is illustrated the preferred form of my invention, in which like numerals of reference indicate like or corresponding parts throughout the several views, the body structure is shaped to provide a receptacle or container substantially rectangular in formation and includes a base 1, preferably formed of sheet metal and substantially rectangular in formation. The marginal edge of this base is turned upwardly to provide the side and end flanges 2. The corners of the container are provided with metallic upright members 3. The end and side walls of the receptacle are preferably constructed of heavy wire screen, and the edges are attached to the flanges 2 and the uprights 3 in any preferred manner. The upper marginal edge of the receptacle is reinforced by the upper flanges 4 formed at the sides and ends at the top of the device.

A centrally located transverse partition 5 is constructed of screen and is mounted in the receptacle dividing the same in front and rear sections. Each end wall is provided with a plurality of inlet openings 6 each of which is circular in formation as shown to advantage in Fig. 1 and each of these circular openings are formed in the end wall and their marginal edges are reinforced by the annular strip 7. Each end section of the receptacle is longitudinally divided, by means of longitudinally extending partitions 8, into a series of compartments 9 each of which serves as a separate unit of the trap so that several trapping units are provided. In the present instance there are six separate compartments and each of these has its top closed by a removable closure plate 10. The adjacent ends of the removable plates 10 are held in position by the pivotally mounted thumb buttons 11 which have oppositely extending wings whereby they may extend over the adjacent ends of the closures to maintain same in position. The outer ends of the closures are engaged by a tongue or lip 11′, one of which is provided for each closure. Thus it will be seen that the closures 10 may be quickly and easily removed in order that access may be had to the interior of the trap.

Inasmuch as the mechanism in each trap compartment is identical, a description of one will suffice. Attached to the outer walls and the vertical longitudinal partitions 8 for each compartment are the opposite guide ways 13 and these guide ways receive a vertically movable plate 14 to which the bait box 15 is secured. The flanges for the guide ways 13 also support a pivot rod 16 upon which a swinging plate 17 is hingedly mounted. This plate comprises the long portion 18 and the short portion 19 which, as shown in Fig. 3, normally extends toward one end of the trap. This plate serves as a baffle to prevent the exit of the rodent after the trap has been sprung. The end wall is provided with a hingedly mounted gate 20 which is adapted to swing in position to close the inlet opening 6 but is normally held in raised position when the trap is set, by resting upon the portion 19 of the baffle plate, thereby holding the baffle plate in substantially horizontal position whereby it will be elevated to permit the rodent to enter the trap. The bait box contains any suitable bait and the animal is thus enticed in through the opening 6 and attempts to secure the bait from the bait box by reaching upwardly to the portion 18 of the plate. This causes the portion 19 to be elevated as shown by dotted lines in Fig. 3 and the closure plate 20 is thus permitted to swing downwardly to close the opening 6. An abutment member 21 in the bottom of the compartment is engaged by the portion 18 as shown by dotted lines so that the swinging movement is limited and the animal is thus prevented from passing outwardly through the opening 6. It will be noted that the baffle plate is thus disposed in approximately the center of the compartment and this will permit another rodent to enter the same compartment by pushing inwardly on the gate 20 and attempting to enter to get the bait whereupon the gate 20 will swing to closed position thus permitting two rodents to be captured in one compartment.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the appended claim.

Having thus fully described my invention what I claim as new and desire to secure by Letters Patent, is:—

A trap comprising a plurality of separate compartments, each provided with a bait box, a baffle plate having a long rearwardly extending portion and a relatively short oppositely extending portion, said compartment having an inlet opening, a closure gate for the said inlet opening and adapted to be disposed in a horizontal position by engagement with said short end of the baffle plate whereby the baffle plate may be held in a substantially horizontal position when the trap is set, both said baffle plate and closure member being adapted for downward swinging movement when disengaged with each other so as to form two separate compartments.

In testimony whereof I affix my signature in presence of two witnesses.

JOHN W. RICHARDS.

Witnesses:
  Mrs. T. A. SANDERS,
  T. A. SANDERS.